(12) United States Patent
Mittleman et al.

(10) Patent No.: US 8,112,130 B2
(45) Date of Patent: Feb. 7, 2012

(54) RECEIVER ACOUSTIC SYSTEM

(75) Inventors: Adam D. Mittleman, San Francisco, CA (US); Kenneth A. Jenks, Capitola, CA (US); Richard P. Howarth, San Francisco, CA (US); Chad G. Seguin, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 641 days.

(21) Appl. No.: 12/342,904

(22) Filed: Dec. 23, 2008

(65) Prior Publication Data
US 2009/0247244 A1   Oct. 1, 2009

Related U.S. Application Data

(60) Provisional application No. 61/041,522, filed on Apr. 1, 2008, provisional application No. 61/044,347, filed on Apr. 11, 2008.

(51) Int. Cl.
*H04M 1/00* (2006.01)
(52) U.S. Cl. ................... 455/575.1; 455/575.8
(58) Field of Classification Search ............... 455/575.1, 455/575.8
See application file for complete search history.

(56) References Cited

U.S. PATENT DOCUMENTS

| | | | |
|---|---|---|---|
| 5,828,012 A | 10/1998 | Repolle et al. | |
| 6,442,194 B1 | 8/2002 | Yasuno et al. | |
| 6,512,834 B1 | 1/2003 | Banter et al. | |
| 6,785,395 B1 | 8/2004 | Arneson et al. | |
| 7,110,536 B2 | 9/2006 | Hampton et al. | |
| 7,466,837 B2 | 12/2008 | Nakamura | |
| 7,792,319 B2 * | 9/2010 | Kimura et al. | 381/431 |
| 7,797,025 B2 * | 9/2010 | Hawker et al. | 455/575.1 |
| 2006/0293091 A1 | 12/2006 | Hawker et al. | |
| 2007/0116261 A1 | 5/2007 | Hawker et al. | |
| 2009/0245564 A1 | 10/2009 | Mittleman et al. | |
| 2009/0245565 A1 | 10/2009 | Mittleman et al. | |

* cited by examiner

*Primary Examiner* — Khai M Nguyen
(74) *Attorney, Agent, or Firm* — Blakely, Sokoloff, Taylor & Zafman LLP

(57) ABSTRACT

A mobile communications device has an outer housing with a front wall in which an acoustic opening is formed. A tub is disposed inside the housing, wherein an acoustic opening is formed in a bottom of the tub and is positioned to be aligned with the acoustic opening in the outer housing. A receiver is disposed within the tub so that a sound port hole of the receiver faces an inside face of the tub and is aligned with the acoustic openings in the outer housing and in the tub. A plate piece is disposed between an inside face of the housing and the face of the receiver in which the sound port hole is formed. An acoustic opening is formed in the plate piece and positioned to be aligned with the sound port hole of the receiver and the acoustic openings in the outer housing and in the tub. Other embodiments are also described.

15 Claims, 5 Drawing Sheets

RECEIVER ACOUSTIC SYSTEM

This application claims the benefit of the earlier filing dates of U.S. provisional application Nos. 61/041,522 filed Apr. 1, 2008 and 61/044,347 filed Apr. 11, 2008.

An embodiment of the invention is directed to an arrangement for packaging or housing a receiver or earpiece, and providing an acoustic path to it, in a portable handheld electronic communications device such as a cellular telephone handset. Other embodiments are also described.

BACKGROUND

Cellular telephone and smart phone handsets have within them an electro-acoustic transducer called a receiver (earpiece) that converts an input electrical audio signal into sound pressure waves that are heard by the user who is holding the handset to her ear. The receiver thus lets the user hear conversation by the other side during a wireless telephone call. Although the sensitivity of the receiver is of course a factor in how well the other side of the conversation can be heard, the manner in which the receiver is packaged inside the relatively tight confines of the handset also plays a big role.

SUMMARY

Several arrangements for packaging or housing a receiver (earpiece) in a portable or mobile communications device are described.

In one embodiment, the mobile device has an outer housing having a front wall in which an acoustic opening, being a face-to-face hole, is formed. A tub or frame is disposed inside the housing so that an outside face of the tub faces forward. The tub may be made of a relatively thin plastic. An acoustic opening, being a face-to-face hole, is formed in a bottom of the tub and is positioned to be aligned horizontally and vertically with the acoustic opening in the outer housing. A receiver is disposed within the tub so that a sound port hole of the receiver faces an inside face of the tub and is aligned with the acoustic openings in the outer housing and in the tub. A plate piece is disposed between an inside face of the housing and the face of the receiver in which the sound port hole is formed, to improve the quality of the receiver's output sound. The plate piece may be a metal piece. The plate piece may be insert molded in the bottom of the tub.

In one embodiment, the plate piece may be acoustically tuned for different versions of the design of a mobile device (or updates to the design), without impacting the tub's insert molding process or the tub mold itself. For instance, in a process for high volume manufacturing of mobile devices, a molded tub (that houses the device's receiver) is manufactured by modifying the design of the plate piece and producing the modified plate piece essentially in parallel with the existing molding process for the tub. The plate piece is then combined with the tub and the receiver into the housing of the device (e.g., insert molded with the tub), without impacting current tooling cavities or plastic volumes for making the tub.

In another embodiment, a separate, acoustic control leak opening, being a face-to-face hole, is formed in a bottom of the tub and positioned to be aligned with the acoustic opening in the outer housing. This further opening acoustically communicates a fixed volume inside the outer housing with the volume of the user's ear (when the device is pressed against the user's ear during handset mode of operation), so as to improve sound quality of the receiver.

In yet another embodiment, a retention clip is provided to hold the receiver in a fixed position. The clip may have a horizontal middle section between first and second vertical curved sections. The horizontal middle section pushes against and thereby holds the receiver in its fixed position within the tub, while the first and second vertical curved sections are hooked onto the tub.

The above summary does not include an exhaustive list of all aspects of the invention. It is contemplated that the invention includes all systems and methods that can be practiced from all suitable combinations of the various aspects summarized above, as well as those disclosed in the Detailed Description below and particularly pointed out in the claims. Such combinations may have particular advantages not specifically recited in the above summary.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
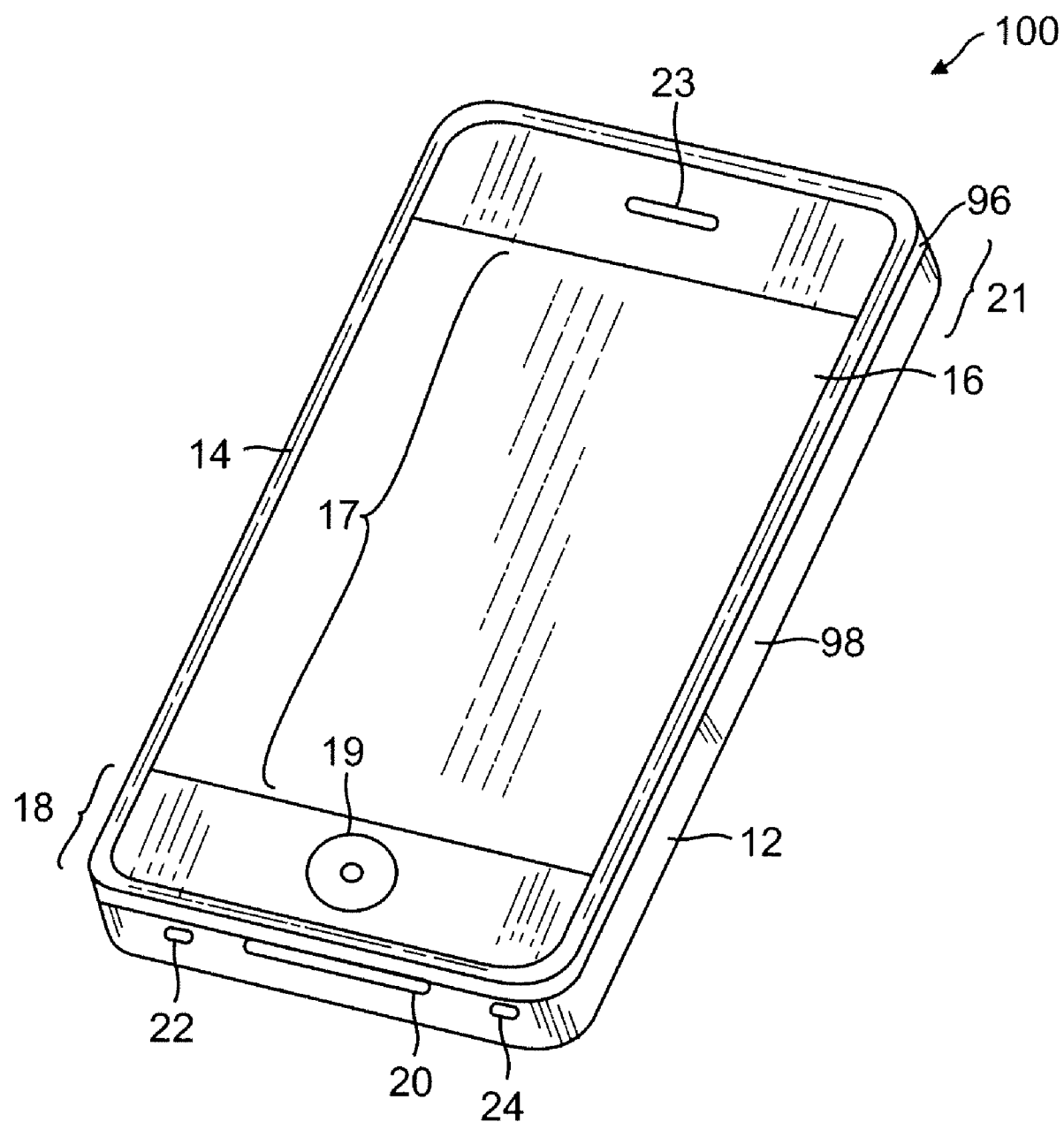
FIG. 1 shows an example, portable handheld electronic communications device.

FIG. 1 shows a portable handheld or mobile electronic communications device 100 (also referred to as a mobile device or a wireless device), such as an iPhone™ device by Apple Inc. of Cupertino, Calif., that has an improved acoustic arrangement for housing a receiver therein. Further details of the device 100 are given below in connection with the description of FIG. 5. For now, it should be appreciated that the device 100 has an outer housing or case 12 that includes at least a front portion 96 and a mating rear portion 98 that when fitted to each other in large part define or close off a chamber in which the constituent electronic components of the device 100 are housed. The housing also has an earphone port (not shown) to receive an earphone plug, a touch sensitive display screen 16, and a speaker acoustic case opening 22. In the example version shown in FIG. 1, the earphone port may be located in a top side of the housing 12 that is opposite a bottom side in which the opening 22 is formed. Alternatively, it could be located elsewhere in the housing 12, such as in the left side or the right side or the bottom side. The speaker acoustic opening 22 may consist of multiple holes clustered together, in the bottom side of the housing as shown or alternatively in the top face or rear face of the housing 12. As an alternative, the speaker acoustic opening 22 may consist of a single, large hole on the bottom side, as shown.

To enable its use as a cellular telephone handset, the device 100 has a receiver location acoustic opening 23 for its receiver, located in its top portion (here, in the front face of the front portion 96 of the housing 12), and a microphone location acoustic opening 24 located in its bottom portion (below the screen 16). In the embodiment shown, the touch sensitive display screen 16 forms essentially the front face of the housing 12. A user-interactive region 17 of the screen 16 lies between the receiver opening 23 and the microphone opening 24, similar to that of an iPhone™ device. In this embodiment, the opening 23 consists of a single larger opening, as compared to a cluster of smaller openings, in the top face of the housing 12. Similarly, the opening 24 for the microphone may consist of a single larger opening in either a top face of the housing 12 or, as shown in FIG. 1, in the bottom side of the housing. The device 100 also has within its housing the needed combination of electronic circuitry and stored software that operate the various input and output components (e.g., touch sensitive display, receiver, microphone, and antenna), to provide the user with mobile telephony functionality.

Figure 2:
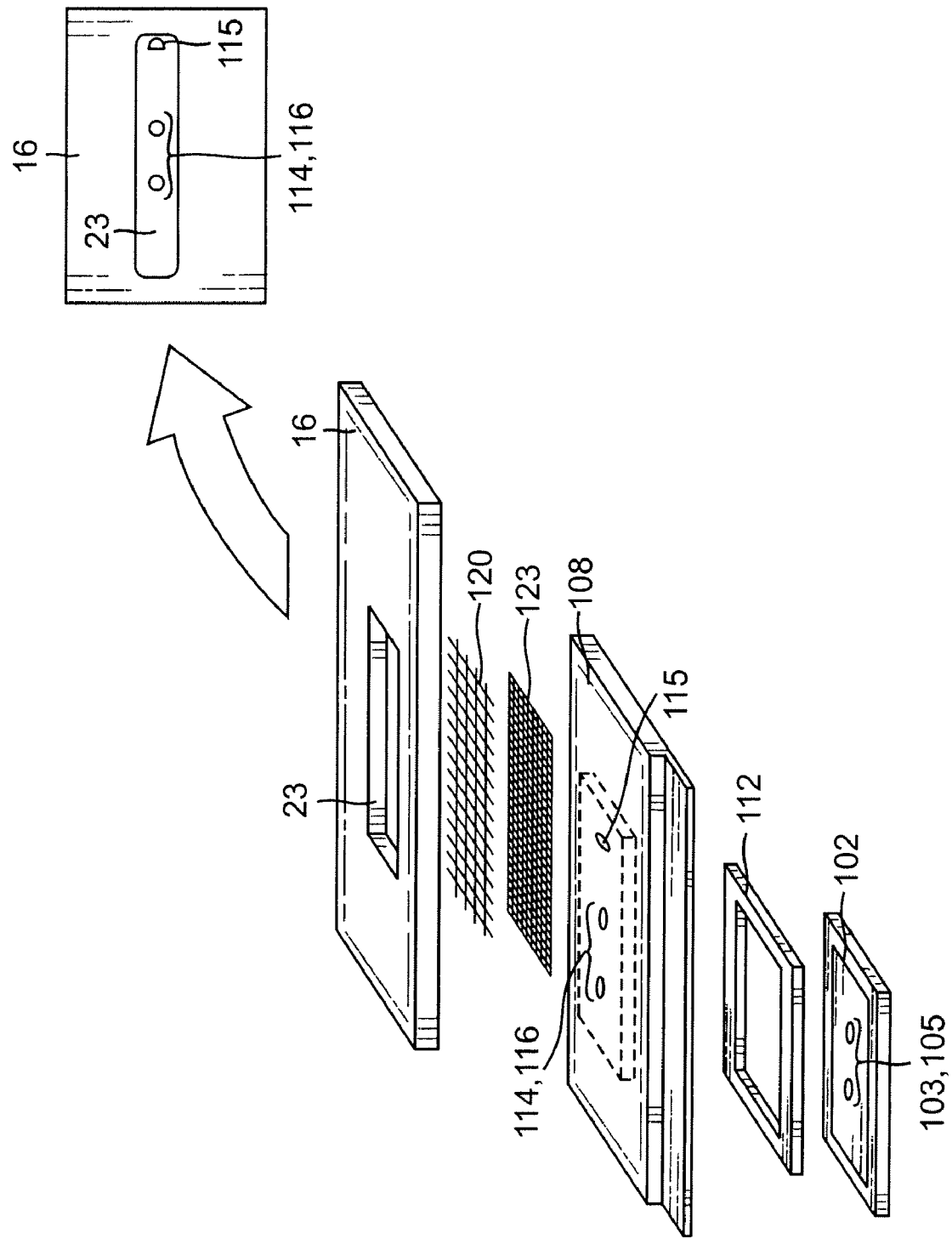
FIG. 2 shows an exploded view of a stack of mechanical components that make up the arrangement for packaging a receiver in the device.

FIG. 2 shows an exploded view of a stack of mechanical components that make up the arrangement for packaging of a receiver 102 in the device 100. The stack, in addition to physically holding the case of the receiver, provides an engineered sound path for the sound pressure waves generated by the receiver to travel to the user's ear. The layers of the stack have the following sequence, beginning with the receiver 120 and moving forward to the front of the device 100.

The receiver 102 has a case or housing in which are formed two or more, separate sound port holes 103, 105. These may be engineered, in this case acoustically tuned, to allow the desired level and/or distribution of sound pressure waves, produced by an internal driver, to emanate from the front face of the case into the receiver sound path created by the stack. The holes 103, 105 in this example are positioned, as a whole, substantially at the center of the front face of the case of the receiver 102 as shown, though they may alternatively be offset from the center. Although not shown, the receiver 102 also has a pair of electrical terminals to which wires (e.g., as a flexible printed circuit) that will conduct the input electrical audio signal may be soldered.

A frame or tub 108 holds the receiver 102. The outside face of the tub 108 looks forward (facing upward in the drawing). The receiver 102 fits into the tub 108 in the region depicted in dotted lines, against the inside face. The tub 108 may be shaped and sized to firmly grip the periphery or sides of the receiver 102 to keep the receiver in a fixed position. See also FIG. 3. Although not shown in FIG. 3, a receiver gasket 112 (e.g., a strip of compliant, pressure sensitive adhesive, or a separate piece of acoustically insulating foam) may be pressed or sandwiched between the receiver 102 and the inside face of the tub 108. This may help insulate against any unwanted sound (inside the device 100) making its way into the user's ear through the sound path of the receiver. The gasket 112 in effect has a face-to-face opening that is at least as large as an area that covers the sound output port holes of the receiver 102 plus the entire area separating the port holes (as shown in FIG. 2). The area of the gasket's opening may be smaller than the full front surface of the receiver 102. The far outside perimeter of the gasket 112 may be coextensive with that of the receiver 102.

The tub 108 has at least two, acoustic tub openings 114, 116, each being a face-to-face hole in the "bottom" of the tub. The shape of the tub and the position of the openings 114, 116 therein are such that the latter may be substantially centered on the front face of the receiver 102, lining up with their respective sound port holes 103, 105 in the receiver case. The openings 114, 116 may be acoustically tuned for passing sound pressure waves emanating from the respective sound port holes of the receiver case. In one embodiment, each of the acoustic tub openings 114, 116 is about the same size as or larger than its respective, receiver case sound port hole, and the outside face of the tub 108 is otherwise essentially flat and smooth so as to visually hide the rest of the receiver case as viewed from the front.

The tub 108 also has a further acoustic controlled leak opening 115 in its bottom, located outside the perimeter of the receiver gasket 112 but inside the area of the acoustic device case opening 23 for the receiver (see FIG. 1). This controlled leak opening 115 effectuates a controlled air or sound leak, between a fixed air volume inside the device 100 and a variable air pocket that is created outside device 100 by virtue of the user pressing the region around the device case opening 116 to her ear. The air pocket is said to be variable, because its volume depends on the size of the user's ear and perhaps how firmly the device 100 is pressed against the ear. The controlled leak helps maintain a more consistent sound from the receiver, despite widely varying air pockets. FIG. 2 also shows a top view of the top portion of the device 100, looking down at the opening 23 through which the acoustic tub openings 114, 116 (at about the center of the opening 23), and the acoustic controlled leak opening 115 (near a left or right edge of the opening 23), can be seen.

Next in the stack is a mesh 123 (e.g., a piece of acoustically engineered material that provides a defined and intentional acoustic resistance or filtering effect). The mesh 123 may be pressed or sandwiched between a rear face of a grill 120 and the outside face of the tub 108 as shown. The mesh 123, in addition to improving the receiver sound path created by the stack, acts as a dust cover for the underlying acoustic tub openings 114, 116 and acoustic controlled leak opening 115. The mesh 123 may be a single piece that has an area large enough to cover all of the openings 114, 115, 116 including the regions between those openings. The mesh 123 may be bonded to the outside face of the tub 108, e.g. by a strip of pressure sensitive adhesive film that surrounds and does not cover the tub openings 114, 115, 116.

Next in the stack is the grill 120. The grill 120 may have been woven or otherwise fabricated to have regularly spaced openings between the chords of a net-like structure. The chord material may be metal (e.g., brass) or other suitable material for fabricating such a structure. The grill 120 serves to protect against objects being inserted into the device 100 that might otherwise damage the underlying mesh 123 or tub openings 114, 115, 116. The openings in the grill 120 should be selected to provide the needed strength to withstand entry of foreign objects into the case of the device 100, while at the same time being acoustically transparent to allow an essentially fully open passage for the receiver's output sound pressure waves to reach the user's ear. The grill 120 may be a single piece that has an area large enough to cover all of the tub openings 114, 115, 116 including the regions between those openings. The grill 123 may be bonded to the mesh 123 and/or the outside face of the tub 108, e.g. by a strip of pressure sensitive adhesive film that surrounds and does not cover the tub openings 114-116.

At the front most portion of the stack is an outer wall, which may be that of the front portion 96 of the external housing or case of the device 100. In this example, such portion of the outer wall is actually part of the top end of the screen 16, above the user-interactive region 17. The outer surface of the wall may define part of the front face of the device 100, above the user-interactive region 17 of the screen 16 (see FIG. 1). The outer wall also has, at a location that lines up with the user's ear (when the device 100 is held by the user to her ear for use as a telephone handset), the acoustic device case opening 23 through which sound pressure waves from the receiver 102 of the device 100 are emitted out of the device 100. This opening 23 is at least as large as an area that covers the tub openings 114, 115, 116, plus the entire area separating those openings. The area of the opening 23 may be smaller than the face area of the grill 120 and/or mesh 123. The outer wall may be made of a plastic, glass or other suitably strong material that can avoid flexing, breakage and/or scratching to a certain extent (e.g., when the device 100 is dropped by its user on a concrete floor).

The components in FIG. 2 may be assembled as follows, in no particular order unless specified): the front face of the gasket 112 may be bonded to otherwise held against the inside surface of the tub 108; the front face of the receiver 102 may be bonded to or otherwise held against the rear face of the gasket 112; the receiver 102 and the gasket 112 are fitted into place inside the tub 108, with tub holes 114, 116 lined up with receiver case holes 103, 105, respectively; the mesh 123 and the grill 120 may be bonded to the outside or front face of the tub, centered with respect to the tub holes 114, 116 and covering the further tub hole 115; and the entire assembly including the tub 108 together with the fitted receiver 102 and attached mesh 123 and grill 120 is fixed against the wall with the opening 23 covering the tub openings 114-116. The two portions 96, 98 may then be joined to each other to close off the inside of the device 100.

Figure 3:
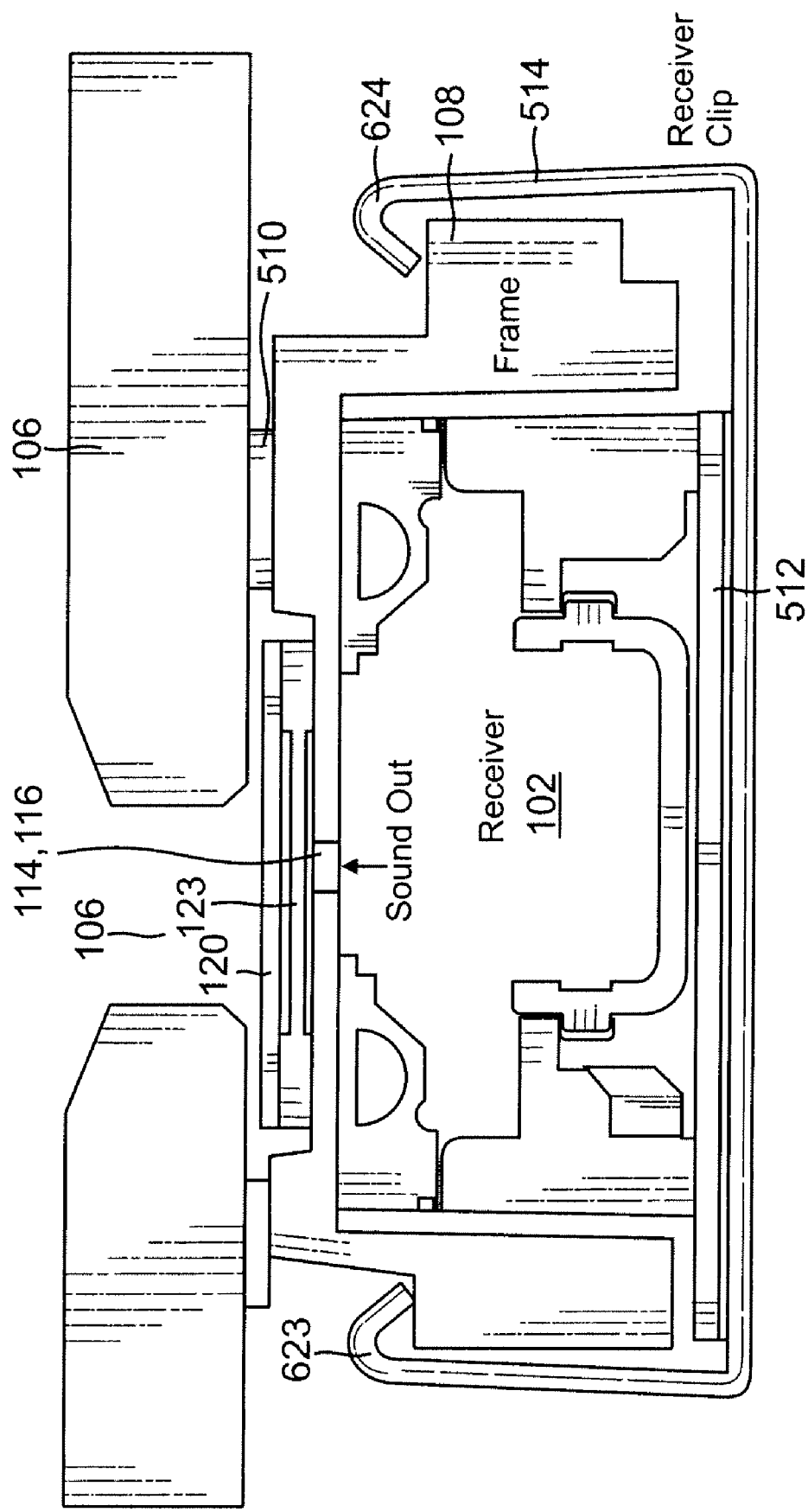
FIG. 3 is a cross section view of an example arrangement for packaging the receiver.

Referring now to FIG. 3, a cross section view of another example arrangement for packaging the receiver 102 is shown. This is similar to the embodiment of FIG. 2 in that the sandwich combination of the grill 120 and the mesh 123 is bonded to the front face of the tub or frame 108, aligned so that output sound pressure waves from the receiver 102 can be emitted through the tub openings 114, 116, then through the grill 120 and mesh 123, and then through the opening 23 in the outer wall of the device 100. The combination of the grill 120 and mesh 123 may be pre-formed as a separate piece, referred to as a guard, that is then bonded to the front face of the frame 108 as shown. To obtain an acoustic seal that prevents outside sound from leaking past the frame 108 and then entering the receiver sound path to the user's ear, a further strip of pressure sensitive adhesive 510 that acts as an acoustic sealing gasket may be applied to either the front face of the frame 108 or the rear face of the outer wall as shown. An alignment mechanism (not shown) may be built into the frame 108, to ensure that the tub openings 114, 116 line up both horizontally and vertically squarely within the opening 23. Either before or after that operation, the receiver 102 can be placed into the tub or frame 108 as shown, with the tub openings 114, 116 lining up with their corresponding receiver case port holes 103, 105 (see FIG. 2), and its front face abutting the bottom of the tub as shown in FIG. 3.

Next, a printed flexible circuit, PFC, 512 is installed. The PFC 512 has one or more conductive pads that provide power to operate the receiver 102 and/or deliver an input electrical audio signal to the receiver 102. These pads are put in electrical contact with one or more respective spring contacts of the receiver 102. The latter contacts are exposed on the rear face of the receiver. They are compressed when they make contact with their pads, by application of a mechanical force to the PFC. This force is applied by installing a receiver clip 514 as shown. The clip 514 has a generally U-shaped cross-section. Its horizontal portion is pushed against the rear face of the PFC 512 until the spring contacts of the receiver 102 have been compressed. It is then held in that position by hooking the opposing, vertical curved ends or hooks 623, 624 of the clip around respective ledges or corners of the frame. See also the view shown in FIG. 4D which is discussed below. The clip 514 may be made of a single metal piece.

Figure 4A:
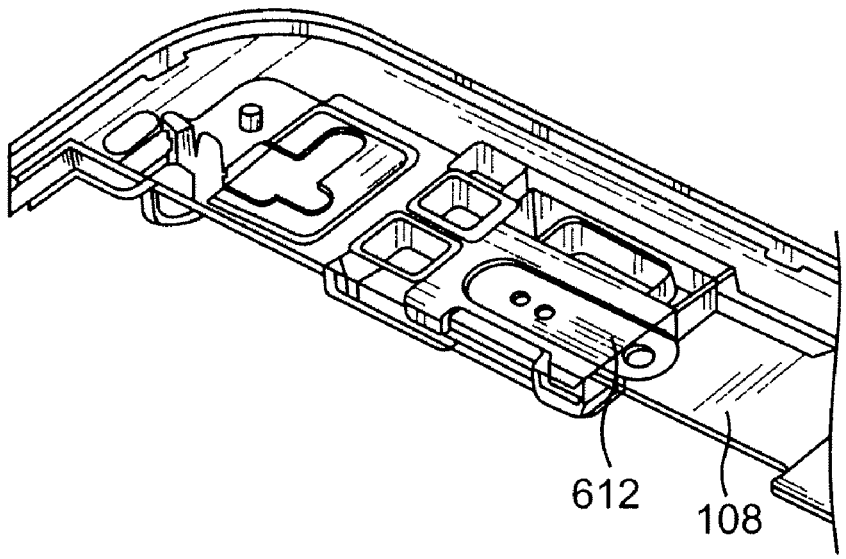
FIGS. 4A-4B show top and bottom views of a molded frame or tub containing a receiver plate piece.
Figure 4B:
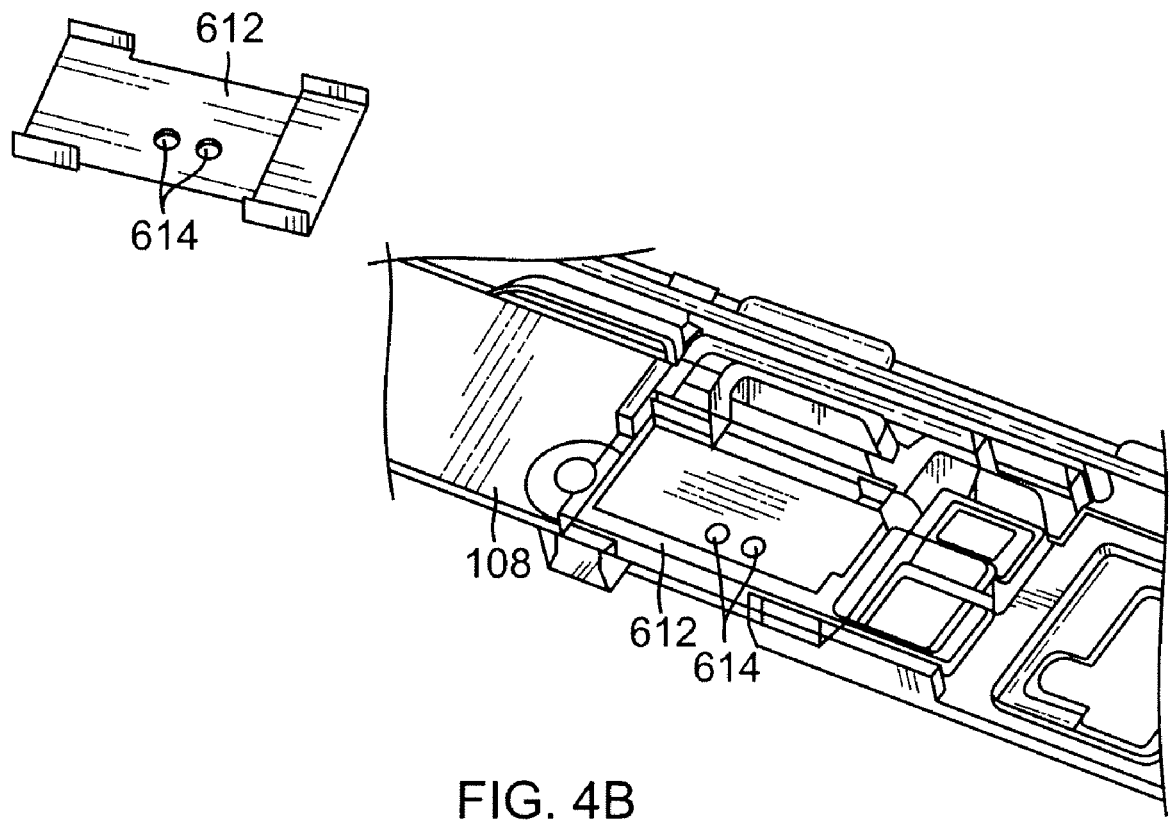

In accordance with another embodiment of the invention, a receiver plate piece 612, such as one made of metal, may be added to the stack, between the front face of the receiver 102 and front face of the frame 108. See FIGS. 4A-4B, where FIG. 4A shows a perspective top view of the frame 108 with the plate piece 612 inserted into the back side of the frame, and where FIG. 4B shows a perspective bottom view of the frame 108 with the plate piece inserted therein (see also FIG. 1). The plate piece 612 has one or more openings 614 that may be located and acoustically tuned to pass sound that is emitted from the receiver port holes 114, 116 (see FIG. 3) that are aligned horizontally and vertically with the plate openings 614. The plate piece 612 may be embedded, e.g. insert molded, into the bottom of the frame 108, so that it is located directly in front of the front face of the installed receiver 102. Note that the tub or frame 108 may have relatively thin plastic walls, e.g. of IXEF polyarylamide. Adding the metal plate may provide improved acoustic characteristics for the receiver or acoustic module, over just the simple and thin plastic walls of the tub. It may help avoid the effect of a drum membrane between the receiver and the user's ear (that might be due to the relatively thin plastic wall of the frame).

In one embodiment, the plate piece 612 may be acoustically tuned for the particular acoustic arrangement surrounding the receiver in different mass produced, mobile devices (or in different versions or updates to a mobile device). For example, the size or arrangement of one or more of the holes 114, 116 can be modified, and/or the thickness, shape, and choice of material may be selected, to promote the desired acoustic characteristics for the receiver. This can be done advantageously, without impacting the process used for making the frame or tub 108 (or the tub mold itself) in which the receiver is housed. For example, in a process for high volume manufacturing of acoustic modules for mobile devices, the acoustic module's molded tub 108 is manufactured by modifying and producing the plate piece 612 essentially in parallel with the existing molding process for making the tub 108, without having to change the latter process. The plate piece 612 is then insert molded with the tub, without impacting for example current tooling cavities or plastic volumes used for making the tub. The following is an example of a method for manufacturing a mobile communications device using such a technique.

A design of the tub 108 is produced; a design of the plate piece 612 is produced; the design of the plate piece is modified so as to tune the experienced, acoustic output produced by the receiver in the mobile device 100; a plate piece is made in accordance with the modified design; a tub is made in accordance with the tub design; and the made plate piece and the made tub are combined into the housing of the mobile device. This may be followed by installing the receiver (into the combination of the made tub and plate piece). Also, as explained earlier, the tub may be molded, and the made plate piece may be insert molded with the tub. Finally, it should be noted that the actual order of these operations is not limited to the order in which they are described here, e.g. the making of the tub and plate piece may occur in parallel.

Returning to FIG. 3, the receiver 102 is shown as being fitted into a space formed out of walls of the tub 108. To maintain the receiver 102 in its fixed position, the hooks 623, 624 of the clip 514 may be inserted into respective gaps of the tub 108 beside the receiver 102. The latter is kept in position by a flat and horizontal body portion of the clip 514 pushing against its back face.

Additional Details of an Example Mobile Device

Referring back to FIG. 1, further details of a wireless electronic device 100 that may have the receiver acoustic arrangement described above are now described. The device 100 may be, for example, a cellular telephone, a media player with wireless communications capabilities, or a hybrid device (such as a smart phone device) that combines several functions, including cellular and/or wireless VOIP telephony, web browsing, digital media player, and global positioning system, into the same handset unit. Examples of hybrid portable electronic devices include a cellular telephone that includes media player functionality, a gaming device that includes a wireless communications capability, a cellular telephone that includes game and email functions, and a portable device that receives email, supports mobile telephone calls, has music player functionality and supports web browsing. These are merely illustrative examples.

The housing 12 may be formed of any suitable materials including, plastic, glass, ceramics, metal, or other suitable materials, or a combination of these materials. In some situations, the entire housing 12 or portions of the housing 12 may be formed from a dielectric or other low-conductivity material, so that the operation of conductive antenna elements of the device 100 that are located within or in proximity to housing 12 is not disrupted. Housing 12 or portions of housing 12 may also be formed from conductive materials such as metal. An illustrative housing material that may be used is anodized aluminum. Aluminum is relatively light in weight and, when anodized, has an attractive insulating and scratch-resistant surface. If desired, other metals can be used for the housing of device 100, such as stainless steel, magnesium, titanium, alloys of these metals and other metals, etc. In scenarios in which housing 12 is formed from metal elements, one or more of the metal elements may be used as part of the antennas in device 10. For example, metal portions of housing 12 may be shorted to an internal ground plane in device 10 to create a larger ground plane element for that device 100.

Housing 12 may have a bezel 14. The bezel 14 may be formed from a conductive material and may serve to hold a display or other device with a planar surface in place on device 100. As shown in FIG. 1, for example, bezel 14 may be used to hold display screen 16 in place by attaching the screen 16 to the upper or front portion 96 of the housing 12.

The screen 16 may be a liquid crystal diode (LCD) display, an organic light emitting diode (OLED) display, or any other suitable display. The outermost surface of screen 16 may be formed from one or more plastic or glass layers. If desired, touch screen functionality may be integrated into display 16 or may be provided using a separate touch pad device. An advantage of integrating a touch screen into screen 16 is that this type of arrangement can save space and reduce visual clutter.

Adding touch sensitivity to the display screen 16 is merely one example of an input-output subsystem that may be integrated into the device 100. If desired, electronic device 100 may have other input-output devices. For example, electronic device 100 may have other user input control devices such as button 19, and input-output components such as port or opening 20 and one or more input-output jacks (e.g., for audio and/or video). Button 19 may be, for example, a menu button. Port 20 may contain a 30-pin data connector (as an example). Openings 24 and 22 may, if desired, form microphone and speaker ports. Speaker port or opening 22 may be used when operating device 100 in speakerphone mode. Opening 23 may also form a speaker port. For example, speaker port or opening 23 may serve as a telephone receiver port that is placed adjacent to a user's ear during operation. In the example of FIG. 1, display screen 16 is shown as being mounted on the front face of handheld electronic device 100, but display screen 16 may, if desired, be mounted on the rear face of handheld electronic device 100, on a side of device 100, on a flip-up portion of device 100 that is attached to a main body portion of device 100 by a hinge (for example), or using any other suitable mounting arrangement.

A user of electronic device 100 may supply input commands using user input interface devices such as button 19 and display screen 16. Suitable user input interface devices for electronic device 100 include buttons (e.g., alphanumeric keys, power on-off, power-on, power-off, and other specialized buttons, etc.), a touch pad, pointing stick, or other cursor control device, a microphone for supplying voice commands, or any other suitable interface for controlling device 100. Although shown schematically as being formed on the top face of electronic device 100 in the example of FIG. 1, buttons such as button 19 and other user input interface devices may generally be formed on any suitable portion of electronic device 100. For example, a button such as button 19 or other user interface control may be formed on the side of electronic device 100. Buttons and other user interface controls can also be located on the top face, rear face, or other portion of device 100. If desired, device 100 can be controlled remotely (e.g., using an infrared remote control, a radio-frequency remote control such as a Bluetooth® remote control, etc.).

Electronic device 100 may have ports such as port 20. Port 20, which may sometimes be referred to as a dock connector, 30-pin data port connector, input-output port, or bus connector, may be used as an input-output port (e.g., when connecting device 100 to a mating dock connected to a computer or other electronic device). Port 20 may contain pins for receiving data and power signals. Device 100 may also have audio and video jacks that allow device 100 to interface with external components. Typical ports include power jacks to recharge a battery within device 100 or to operate device 100 from a direct current (DC) power supply, data ports to exchange data with external components such as a personal computer or peripheral, audio-visual jacks to drive headphones, a monitor, or other external audio-video equipment, a subscriber identity module (SIM) card port to authorize cellular telephone service, a memory card slot, etc. The functions of some or all of these devices and the internal circuitry of electronic device 100 can be controlled using input interface devices such as display screen 16.

Components such as display screen 16 and other user input interface devices may cover most of the available surface area on the front face of device 100 (as shown in the example of FIG. 1) or may occupy only a small portion of the front face of device 100. Because electronic components such as display 16 often contain large amounts of metal (e.g., as radio-frequency shielding), the location of these components relative to the antenna elements in device 100 should generally be taken into consideration. Suitably chosen locations for the antenna elements and electronic components of the device will allow the antennas of electronic device 100 to function properly without being disrupted by the electronic components.

Examples of locations in which antenna structures may be located in device 100 include region 18 and region 21. These are merely illustrative examples. Any suitable portion of device 100 may be used to house antenna structures for device 100 if desired.

Figure 5:
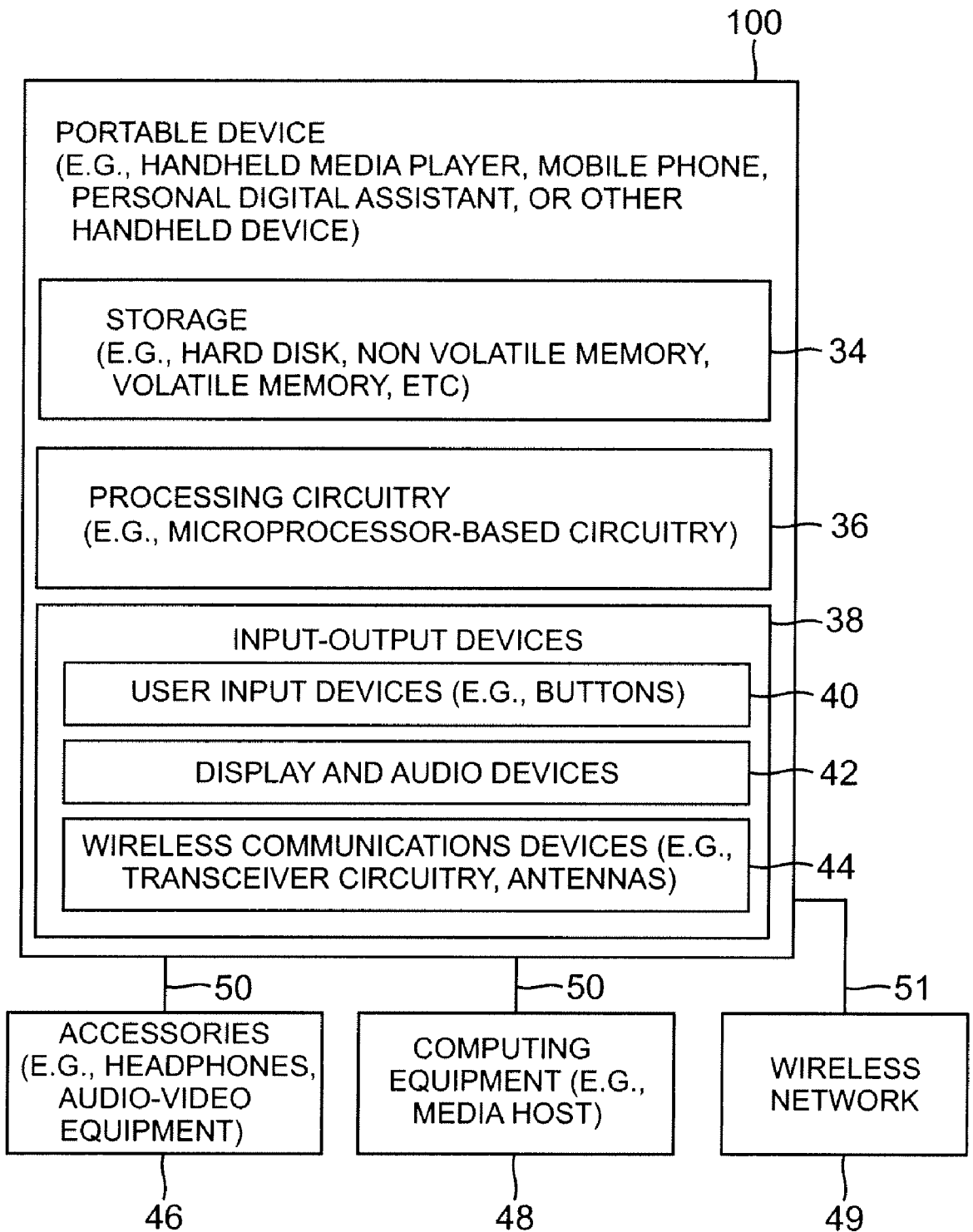
FIG. 5 is a block diagram of the components that make up the wireless electronic device of FIG. 1.

A schematic diagram of an embodiment of an illustrative portable electronic device such as a handheld electronic device is shown in FIG. 5. Portable device 100 may be a mobile telephone, a mobile telephone with media player capabilities, a handheld computer, a remote control, a game player, a global positioning system (GPS) device, a laptop computer, a tablet computer, an ultra-portable computer, a combination of such devices, or any other suitable portable electronic device.

As shown in FIG. 5, device 100 may include storage 34. Storage 34 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 36 may be used to control the operation of device 100. Processing circuitry 36 may be based on a processor such as a microprocessor and other suitable integrated circuits. With one suitable arrangement, processing circuitry 36 and storage 34 are used to run software on device 100, such as internet browsing applications, voice-over-internet-protocol (VOIP) telephone call applications, email applications, media playback applications, operating system functions, etc. Processing circuitry 36 and storage 34 may be used in implementing suitable communications protocols such as internet protocols, wireless local area network protocols (e.g., IEEE 802.11 protocols—sometimes referred to as Wi-Fi®), protocols for other short-range wireless communications links such as the Bluetooth® protocol, protocols for handling 3G communications services (e.g., using wide band code division multiple access techniques), 2G cellular telephone communications protocols, etc.

To minimize power consumption, processing circuitry 36 may include power management circuitry to implement power management functions. For example, processing circuitry 36 may be used to adjust the gain settings of amplifiers (e.g., radio-frequency power amplifier circuitry) on device 100. Processing circuitry 36 may also be used to adjust the power supply voltages that are provided to portions of the circuitry on device 100. For example, higher direct-current (DC) power supply voltages may be supplied to active circuits and lower DC power supply voltages may be supplied to circuits that are less active or that are inactive. If desired, processing circuitry 36 may be used to implement a control scheme in which the power amplifier circuitry is adjusted to accommodate transmission power level requests received from a wireless network.

Input-output devices 38 may be used to allow data to be supplied to device 100 and to allow data to be provided from device 100 to external devices. Display screen 16, button 19, microphone port 24, speaker port 22, and dock connector port 20 are examples of input-output devices 38.

Input-output devices 38 can include user input-output devices 40 such as buttons, touch screens, joysticks, click wheels, scrolling wheels, touch pads, key pads, keyboards, microphones, cameras, etc. A user can control the operation of device 100 by supplying commands through user input devices 40. Display and audio devices 42 may include liquid-crystal display (LCD) screens or other screens, light-emitting diodes (LEDs), and other components that present visual information and status data. Display and audio devices 42 may also include audio equipment such as speakers and other devices for creating sound. Display and audio devices 42 may contain audio-video interface equipment such as jacks and other connectors for external headphones and monitors.

Wireless communications devices 44 may include communications circuitry such as radio-frequency (RF) transceiver circuitry formed from one or more integrated circuits, power amplifier circuitry, passive RF components, antennas, and other circuitry for handling RF wireless signals. Wireless signals can also be sent using light (e.g., using infrared communications).

Device 100 can communicate with external devices such as accessories 46, computing equipment 48, and wireless network 49 as shown by paths 50 and 51. Paths 50 may include wired and wireless paths. Path 51 may be a wireless path. Accessories 46 may include headphones (e.g., a wireless cellular headset or audio headphones) and audio-video equipment (e.g., wireless speakers, a game controller, or other equipment that receives and plays audio and video content), a peripheral such as a wireless printer or camera, etc.

Computing equipment 48 may be any suitable computer. With one suitable arrangement, computing equipment 48 is a computer that has an associated wireless access point (router) or an internal or external wireless card that establishes a wireless connection with device 100. The computer may be a server (e.g., an internet server), a local area network computer with or without Internet access, a user's own personal computer, a peer device (e.g., another portable electronic device 100), or any other suitable computing equipment.

Wireless network 49 may include any suitable network equipment, such as cellular telephone base stations, cellular towers, wireless data networks, computers associated with wireless networks, etc. For example, wireless network 49 may include network management equipment that monitors the wireless signal strength of the wireless handsets (cellular telephones, handheld computing devices, etc.) that are in communication with network 49.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the receiver case depicted in FIG. 2 is rectangular, the receiver case may alternatively have a different shape (e.g., circular). The description is thus to be regarded as illustrative instead of limiting.

What is claimed is:

1. A mobile communications device comprising:
   an outer housing having a front wall in which an acoustic opening, being a face-to-face hole, is formed;
   a tub disposed inside the housing so that an outside face of the tub faces forward, wherein an acoustic opening, being a face-to-face hole, is formed in a bottom of the tub and is positioned to be aligned with the acoustic opening in the outer housing;
   a receiver disposed within the tub so that a sound port hole of the receiver faces an inside face of the tub and is aligned with the acoustic openings in the outer housing and in the tub; and
   a plate piece disposed between an inside face of the housing and the face of the receiver in which the sound port hole is formed, wherein an acoustic opening, being a face-to-face hole, is formed in the plate piece and positioned to be aligned with the sound port hole of the receiver and the acoustic openings in the outer housing and in the tub.

2. The mobile communications device of claim 1 wherein the plate piece is a metal piece and the tub is made of plastic.

3. The mobile communications device of claim 2 wherein the plate piece is insert molded in the bottom of the tub.

4. The mobile communications device of claim 1 wherein the plate piece is embedded in the bottom of the tub.

5. The mobile communications device of claim 1 wherein an outside face of the tub visually hides the receiver except for the sound port hole.

6. The mobile communications device of claim 1 further comprising a stack of components for packaging the receiver, wherein the stack includes a gasket, a mesh, and a grille disposed in the following sequence, beginning with the receiver and moving forward: the receiver, the gasket, the bottom of the tub, the mesh, the grill, and the front wall of the outer housing.

7. A mobile communications device comprising:
   an outer housing having a front wall in which a first acoustic opening, being a face-to-face hole, is formed;
   a tub disposed inside the outer housing so that an outside face of the tub faces forward, wherein a second acoustic opening and a separate, acoustic control leak opening, both being face-to-face holes, are formed in a bottom of the tub and positioned to be aligned with the acoustic opening in the outer housing; and
   a receiver disposed within the tub so that a sound port hole of the receiver faces an inside face of the tub and is aligned with the first and second acoustic openings in the outer housing and in the tub.

8. The mobile communications device of claim 7 further comprising an acoustic gasket sandwiched between the face of the receiver in which the sound port hole is formed and the inside face of the tub,
   wherein the separate, acoustic control leak opening is located outside the perimeter of the acoustic gasket.

9. The mobile communications device of claim 7 further comprising a stack of components for packaging the receiver, wherein the stack includes a gasket, a mesh, and a grille disposed in the following sequence, beginning with the receiver and moving forward: the receiver, the gasket, the bottom of the tub, the mesh, the grill, and the front wall of the outer housing.

10. A mobile communications device comprising:
    an outer housing having a front wall in which a first acoustic opening, being a face-to-face hole, is formed;
    a tub disposed inside the outer housing so that an outside face of the tub faces forward, wherein a second acoustic opening being a face-to-face hole is formed in a bottom of the tub and positioned to be aligned with the first acoustic opening in the outer housing;
    a receiver disposed within the tub so that a sound port hole of the receiver faces an inside face of the tub and is aligned with the first and second acoustic openings in the outer housing and in the tub; and
    a retention clip having a horizontal middle section between first and second vertical curved sections, the horizontal middle section pushing against and thereby holding the receiver in a fixed position within the tub while the first and second vertical curved sections are hooked onto the tub.

11. The mobile communications device of claim 10 further comprising a printed flexible circuit, PFC, having a conductive pad that provides power to operate the receiver or delivers an input electrical audio signal to the receiver, wherein the pad is in electrical contact with a spring contact of the receiver that is exposed on a rear face of the receiver.

12. The mobile communications device of claim 11 wherein the spring contact of the receiver is compressed while making contact with the pad, by application of a mechanical force to the PFC applied by the retention clip.

13. A method for manufacturing a mobile communications device, comprising:
    a) producing a design of a tub, the tub to be disposed inside a housing of a mobile communications device so that a first acoustic opening, being a face-to-face hole that is formed in a bottom of the tub, is aligned with a second acoustic opening in the housing, wherein a receiver is to be disposed within the tub so that a sound port hole of the receiver is aligned with the first and second acoustic openings;
    b) producing a design of a plate piece, the plate piece to be disposed between the housing and the receiver so that a third acoustic opening, being a face-to-face hole that is formed in the plate piece, is aligned with the sound port hole of the receiver and the first and second acoustic openings;
    c) modifying the design of the plate piece to tune the experienced acoustic output from the receiver in the mobile device;
    d) making a plate piece in accordance with the modified design;
    e) making a tub in accordance with the tub design; and
    f) combining the made plate piece and the made tub into the housing of the mobile device.

14. The method of claim 13 wherein in e), the tub is molded, and in f), the made plate piece is insert molded with the tub.

15. The method of claim 14 further comprising:
    installing the receiver into the made tub, after the made plate piece has been inserted molded with the tub.

* * * * *